United States Patent
Hogan

(10) Patent No.: US 7,100,937 B2
(45) Date of Patent: Sep. 5, 2006

(54) LOCKING DEVICE FOR GOOSENECK TRAILERS

(76) Inventor: Larry Ross Hogan, 19497 Ballentine Rd., Tahlequah, OK (US) 74464

( * ) Notice: Subject to any disclaimer, the term of this patent is extended or adjusted under 35 U.S.C. 154(b) by 0 days.

(21) Appl. No.: 11/059,933

(22) Filed: Feb. 17, 2005

(65) Prior Publication Data

US 2005/0179233 A1     Aug. 18, 2005

Related U.S. Application Data

(63) Continuation-in-part of application No. 10/708,161, filed on Feb. 12, 2004, now abandoned.

(51) Int. Cl.
  *E05B 65/12* (2006.01)
(52) U.S. Cl. .......................... 280/507; 70/200; 70/203; 280/14
(58) Field of Classification Search ............... 280/507; 70/14, 200, 203, 204, 226
  See application file for complete search history.

(56) References Cited

U.S. PATENT DOCUMENTS

| | | | | |
|---|---|---|---|---|
| 1,260,237 A | * | 3/1918 | Miller | 70/203 |
| 1,333,878 A | * | 3/1920 | Smith | 70/253 |
| 1,435,560 A | * | 11/1922 | Simmons | 70/200 |
| 4,263,869 A | * | 4/1981 | Wahnschaff | 118/249 |
| 4,779,435 A | * | 10/1988 | Farrow | 70/238 |
| 4,862,714 A | * | 9/1989 | Taylor et al. | 70/25 |
| 5,109,683 A | * | 5/1992 | Cartwright | 70/14 |
| 5,165,263 A | * | 11/1992 | Perron et al. | 70/177 |
| 5,181,405 A | | 1/1993 | Wheeler | |
| 5,255,545 A | | 10/1993 | Wheeler | |
| 5,263,735 A | | 11/1993 | Mann | |
| 5,322,316 A | | 6/1994 | Wheeler | |
| 5,513,871 A | | 5/1996 | Johnson | |
| 5,520,030 A | | 5/1996 | Muldoon | |
| 5,582,420 A | | 12/1996 | Ulbrich | |
| 5,662,195 A | * | 9/1997 | Rush | 192/3.51 |
| 5,787,738 A | * | 8/1998 | Brandt et al. | 70/58 |
| 5,802,887 A | * | 9/1998 | Beland | 70/14 |
| 6,109,078 A | | 8/2000 | Marshall | |
| 6,202,453 B1 | * | 3/2001 | Disher et al. | 70/14 |
| 6,264,229 B1 | | 7/2001 | Gill et al. | |
| 6,315,315 B1 | | 11/2001 | Seale | |
| 6,464,241 B1 | | 10/2002 | Daniel | |
| 6,467,317 B1 | * | 10/2002 | Hillabush et al. | 70/56 |
| 6,880,368 B1 | | 4/2005 | Ulbrich et al. | |
| 6,997,420 B1 | * | 2/2006 | Yudis et al. | 248/89 |

* cited by examiner

*Primary Examiner*—Kevin Hurley
(74) *Attorney, Agent, or Firm*—Molly D. McKay

(57) ABSTRACT

A gooseneck trailer coupler lock which disables normal coupler operation by restricting movement of the lower latching plate of the coupler when the coupler is placed in the fully closed position. The locking device is a single piece of hardened metallic material which inserts into a gap formed between the upper coupler plate and a band attached to the lower latching coupler plate. The locking device is secured in place with a block type lock or other theft resistant lock. When the locking device is installed, the coupler opening is secured in a position which will not accept a typical towing ball without first removing the locking device.

3 Claims, 5 Drawing Sheets

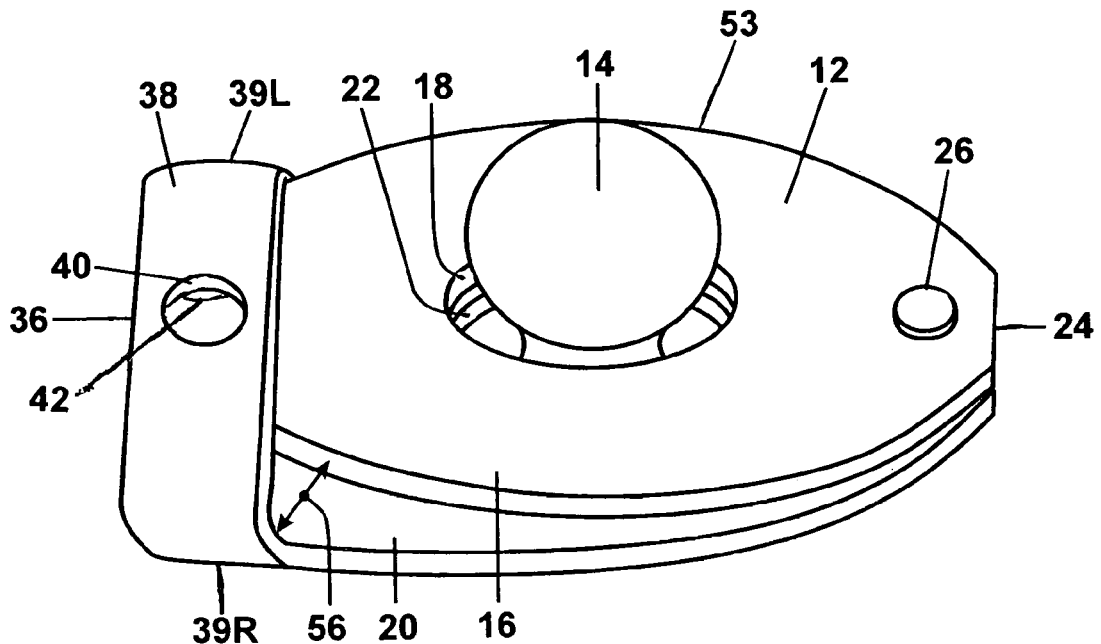
FIG. 3 - PRIOR ART
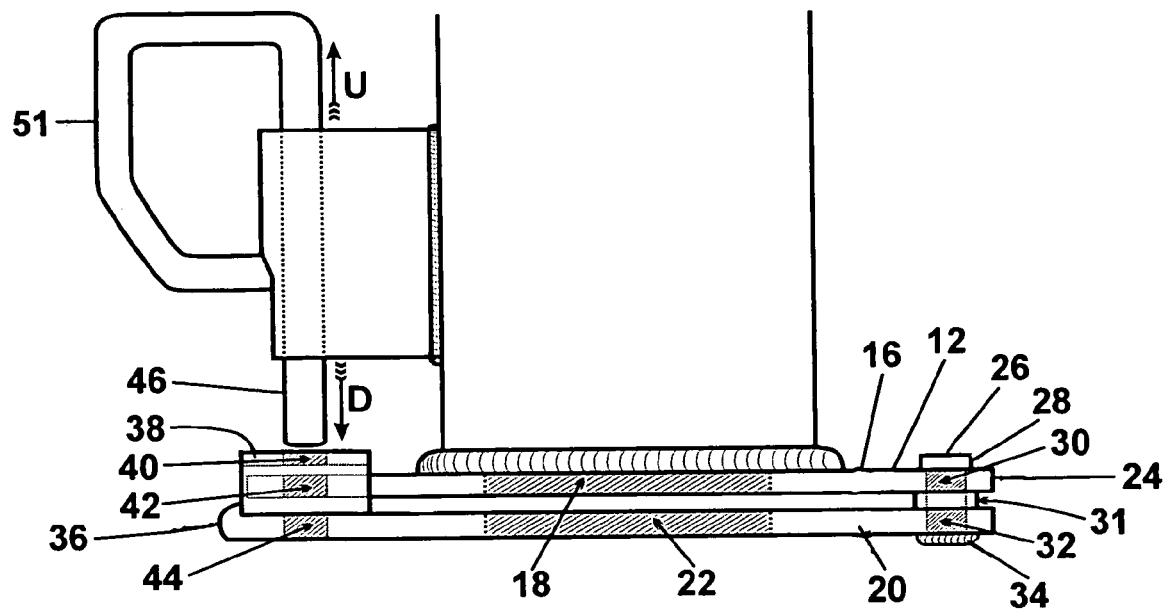
FIG. 4 - PRIOR ART

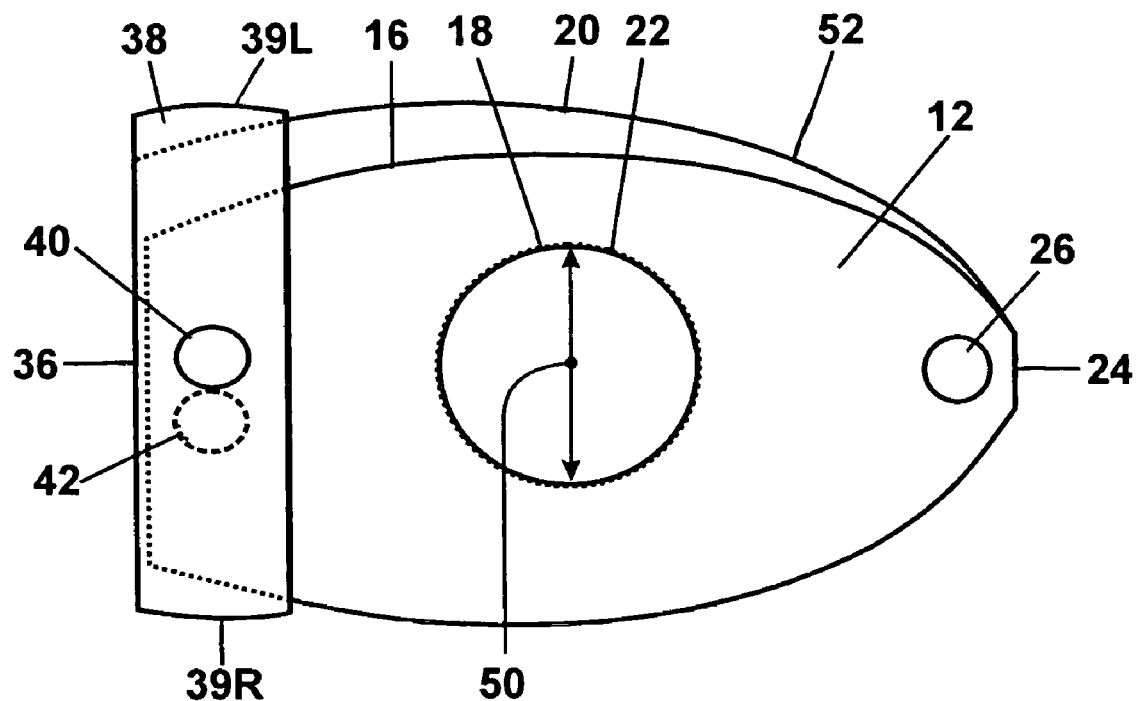
FIG. 5 - PRIOR ART
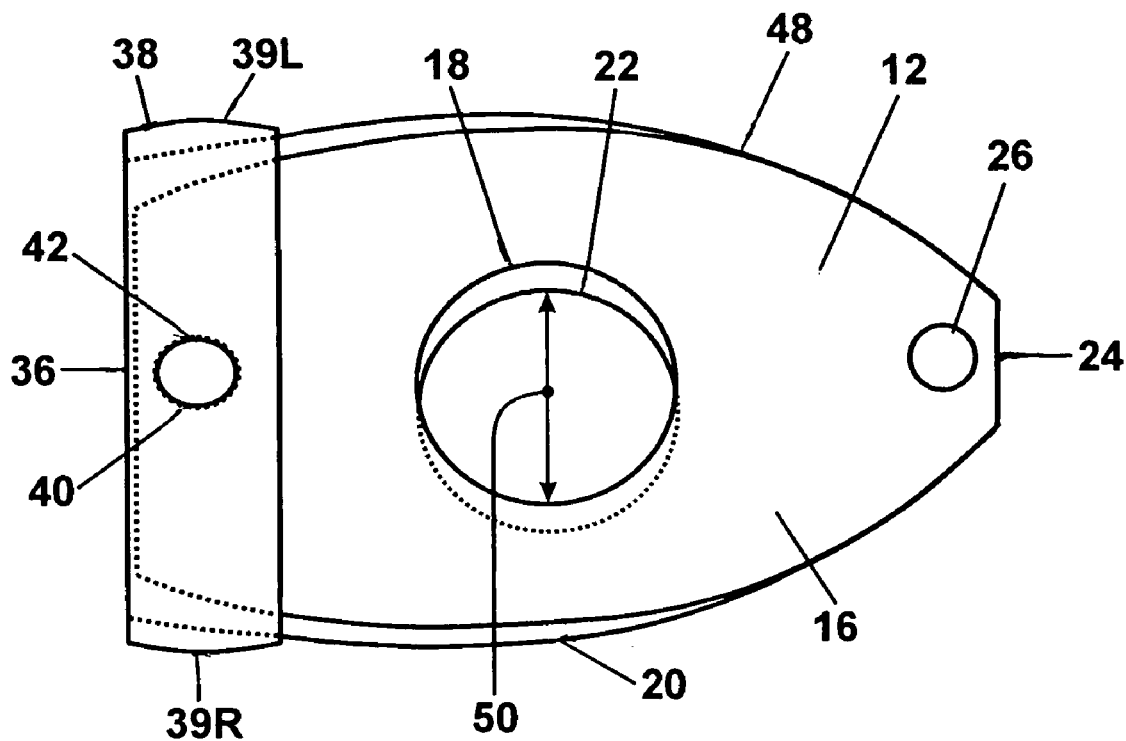
FIG. 6 - PRIOR ART

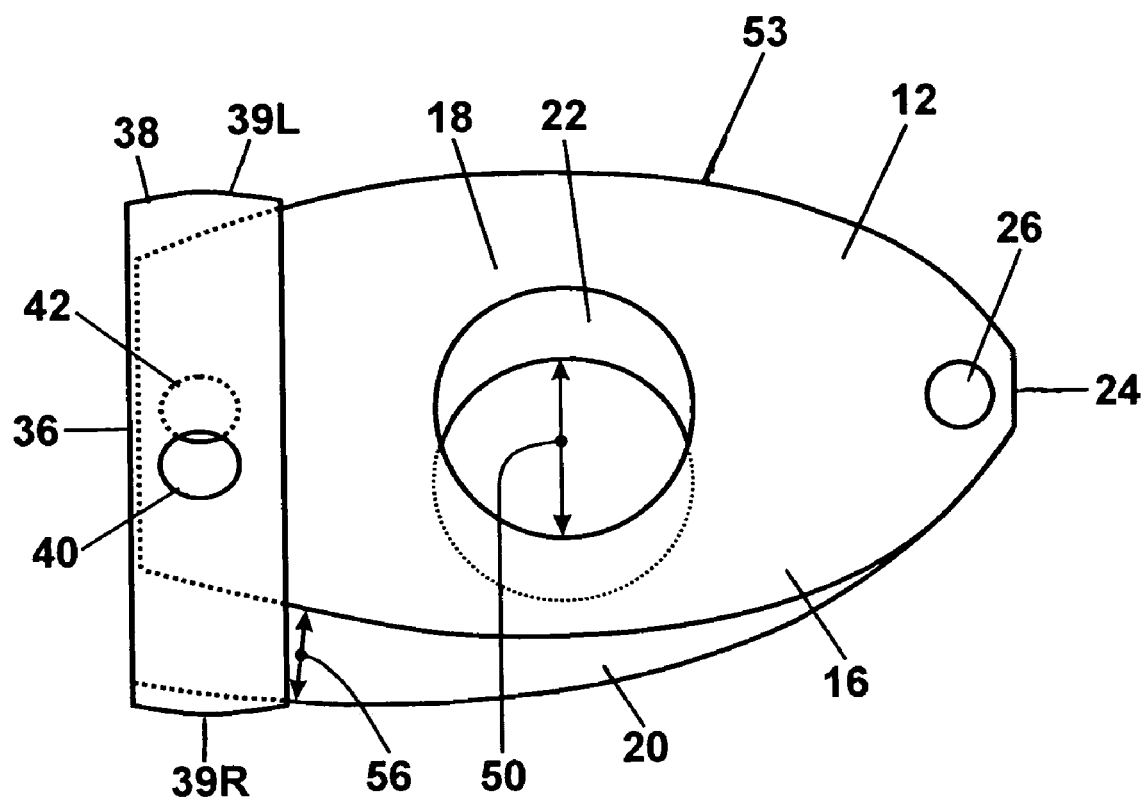
FIG. 9 - PRIOR ART

LOCKING DEVICE FOR GOOSENECK TRAILERS

CROSS-REFERENCE TO RELATED APPLICATIONS

The present application is a continuation in part of U.S. patent application Ser. No. 10/708,161 entitled GoosLock—A Locking Device for Gooseneck trailers which was filed on Feb. 12, 2004 now abandoned.

BACKGROUND OF THE INVENTION

1. Field of the Invention

The present invention relates to a one piece locking device for use in association with a gooseneck trailer coupler to prevent the trailer from being stolen when the trailer is detached from its associated tow vehicle. The locking device disables normal coupler operation by restricting the movement of the lower latching plate of a gooseneck trailer coupler when the coupler is placed in a self-obstructing, fully closed position. When properly installed and secured with an appropriate padlock, the locking device prevents typical 2 5/16 inch, 2 inch, and 1 7/8 inch towing balls from entering the gooseneck coupler, thus deterring theft of an unhooked trailer.

2. Description of the Related Art

According to law enforcement agencies, many thousands of trailers are reported stolen each year. Most are stolen while unlocked and/or unprotected from theft. This invention is intended to prevent thefts of opportunity. The invention is a locking device to be used by individuals and by those in the agricultural, construction, and other industries where gooseneck type trailers are used. It provides a theft deterrent for unhooked, parked trailers.

Most gooseneck trailer couplers in common use include safety features which are designed to prevent a coupler from becoming detached from a towing vehicle during normal towing operations. The safety features include spring loaded latching plates, vertical rods to secure the relative position of the coupler plates, and horizontal rods to reduce the size of the coupler opening. The couplers currently in widespread use do not provide any built-in means of protecting a trailer from theft when the trailer is unhooked from its tow vehicle.

There are distinct differences between the safety features incorporated into common gooseneck couplers and the present locking device. Safety features, such as spring loaded latching plates and vertically oriented rods used to secure the relative position of the top and bottom plates, provide a measure of safety to prevent the coupler from becoming detached from a towing ball while a trailer is being towed. Safety features allow a user to connect and disconnect a trailer using normal force of hand. The present locking device is, on the other hand, used to disable normal coupler operations, and provides theft protection for unhooked or parked trailers. The plates of the coupler are secured in a fully closed position which obstructs the coupler opening and prevents the trailer from being attached to a tow vehicle without first removing the locking device, either by unlocking it or by defeating the locking device by force.

There is a need for an effective, inexpensive, quickly installed locking device for trailers with gooseneck couplers. The vast majority of trailer thefts occur when a potential thief identifies an unlocked trailer in an insecure location. The time spent at the crime scene is critical in this type of theft. It takes less than two minutes to connect an unlocked trailer to a tow vehicle. Most people involved in theft have access to a tow vehicle equipped with a standard 2 5/16 inch towing ball. Other methods which do not require the use of a coupler and towing ball are used to steal trailers, but they represent a very small percentage of the overall numbers. A professional thief can steal a trailer whether it is locked or not. Thefts of opportunity can be deterred by using a locking device which will not allow standard towing balls, i.e. 2 5/16 inch, 2 inch, and 1 7/8 inch towing balls, to be used to connect to the trailer.

To be effective, the locking device must resist the use of bolt cutters, hacksaws, pry bars, and hammers. Also, to be effective, considerable time and noise must be involved to forcibly remove the locking device from the trailer. The present invention is construction of metal and its shape makes it difficult to remove from the trailer without unlocking an associated lock that secures the locking device to the trailer.

The prior art is composed of locks which are relatively large, cumbersome, expensive, and time consuming to install and remove. Due to these characteristics, they are often left in the cab or bed of the tow vehicle, or in a shop or barn, and are not installed. Most of these prior art locks employ two or more components which can become separated and misplaced. These prior art locks are generally designed to prevent theft of a trailer by inserting an obstructing object into or over the towing ball opening of the coupler. The obstructing object is normally formed as a part of a complex casting or multiple welded components. The assembled unit of such a prior art lock surrounds the coupler and holds the obstruction in place when secured with an internal or external lock. Another method used to prevent the obstruction from being removed is to attach the unit to the coupler lever handle. Other designs incorporate a telescoping pole attached to an obstruction at the coupler end, and to trailer jack stand components at the other end.

U.S. Pat. No. 6,464,241 issued Oct. 15, 2002 to Daniel for Gooseneck Trailer Hitch, is an example of the widespread use of a vertically oriented rod to maintain the relative position of the coupler plates during normal towing operations. This design also incorporates the use of a spring to pre-position the lower plate of a coupler and assist the user when connecting a trailer to a tow vehicle. This gooseneck trailer hitch provides no theft deterrent protection features.

U.S. Pat. No. 5,263,735 issued Nov. 23, 1993, to Mann for Gooseneck Trailer Coupler is another example of the widespread use of a vertically oriented rod designed to maintain the relative position of the coupler plates during normal towing operations. This gooseneck trailer hitch also provides no theft deterrent protection features.

U.S. Pat. No. 6,264,229 issued Jul. 24, 2001 to Gill et al. for Gooseneck Trailer Coupler is an example of a coupler which incorporates the use of a chuck and pinion gear which rotate to position jaws that are designed to narrow the coupler opening and prevent the coupler from becoming detached from a towing ball. This coupler design is significantly different than couplers in widespread use which incorporate a fixed upper plate and a moveable bottom plate.

U.S. Pat. No. 6,315,315 issued Nov. 13, 2001 to Seale for Gooseneck Trailer Lock is an example of a type of lock that obstructs the coupler opening using a complex casting and an integrated lock.

U.S. Pat. No. 5,181,405 issued Jan. 26, 1993 to Wheeler for Gooseneck Trailer Hitch Lock, and U.S. Pat. No. 5,255,545 issued Oct. 26, 1993, to Wheeler for Gooseneck Trailer Hitch Locking Device, both provide examples of the type of lock that surrounds the coupler with multiple complex parts.

U.S. Pat. No. 5,322,316 issued Jun. 21, 1994 to Wheeler for Anti-theft Coupler Device, is an example of the type of lock that surrounds the coupler and inserts an obstruction into the coupler opening. The device is designed to work with couplers which use a horizontally oriented shaft to narrow the coupler opening versus a coupler with a fixed upper plate and moveable bottom plate such as the type for which the present invention is designed to work.

U.S. Pat. No. 5,513,871 issued May 7, 1996 to Johnson for Gooseneck Trailer Hitch Locking Device is an example of the type of lock that obstructs the coupler opening using multiple welded components which are secured in place by attaching to the coupler lever handle.

U.S. Pat. No. 5,520,030 issued May 28, 1996, to Muldoon for Gooseneck Trailer Lock, and U.S. Pat. No. 6,109,078 issued Aug. 29, 2000 to Marshall for Trailer and Jack Stand Lock Assembly are both examples of locks which use multiple components and incorporate a telescoping pole which extends from the coupler opening to the trailer jack stand assembly.

All of the referenced gooseneck coupler locks are relatively expensive and difficult to fabricate, and use additional materials to obstruct the coupler opening. The locking device of the present invention works in cooperation with existing coupler components and secures the coupler in a self-obstructing fully closed position. For that reason it is much smaller than prior art devices, is very simple to use, and is less expensive to produce. In addition, the present device can be attached to the coupler to prevent it from being lost and to keep it handy for locking a parked trailer. The lock to be used in association with the present locking device is a rectangular block style padlock with narrow shackle gap to resist bolt cutters, constructed with a hardened, rotating steel shackle pinned at both the toe and heel end to resist hacksaws; and employing hardened steel, anti-saw rods formed into the padlock body to resist sawing.

SUMMARY OF THE INVENTION

The present invention is a one piece locking device that attaches to and disables normal coupler operation by restricting the movement of the lower latching plate of a gooseneck trailer coupler when the coupler is placed in a self-obstructing, fully closed position. The device is provided with a shaft that is designed to extend thorough a gap formed between an upper plate and a metal band on the lower latching plate of the coupler. The device is inserted into the gap until at least one opening provided in the shaft of the device extends beyond the coupler. An opposite block end of the device is too large to pass through the gap and serves to limit the device's insertion into the gap.

Once the device is thus properly installed in the coupler, the device is secured in place with an appropriate padlock that is inserted through one of the openings provided in the shaft of the device that is now extending beyond the coupler. When thus secured to the coupler, the locking device prevents typical 2 5/16 inch, 2 inch, and 1 7/8 inch towing balls from entering the gooseneck coupler, thereby deterring theft of an unhooked trailer.

To remove the device from the coupler, the padlock is removed from the opening in the shaft of the device and the device is pulled out of the coupler. This frees the coupler to function in a normal manner, i.e. allows the lower latching plate to move freely relative to the upper plate in order to admit a towing ball to enter the ball openings provided in each of the two plates.

When the locking device is not in use, it can be easily attached to the trailer coupler to prevent the locking device from being lost or misplaced.

BRIEF DESCRIPTION OF THE DRAWINGS

FIG. 3 is a perspective view of a prior art gooseneck coupler which is in common use shown attached to a towing ball and shown with the socket cover removed from the coupler so that the towing ball can be seen.

FIG. 4 is a side view of the coupler of FIG. 3 shown with a gooseneck stem welded onto the coupler in order to illustrate the function of a safety rod which is attached to the gooseneck stem.

FIG. 5 is a top plan view of the prior art gooseneck coupler of FIG. 3 shown placed in an open position.

FIG. 6 is a top plan view of the prior art gooseneck coupler of FIG. 5 shown placed in a normal towing position.

FIG. 9 is a top plan view of the prior art gooseneck coupler of FIGS. 5 and 6 shown placed in a fully closed position.

DETAILED DESCRIPTION OF THE PREFERRED EMBODIMENT

THE INVENTION

Figure 1:
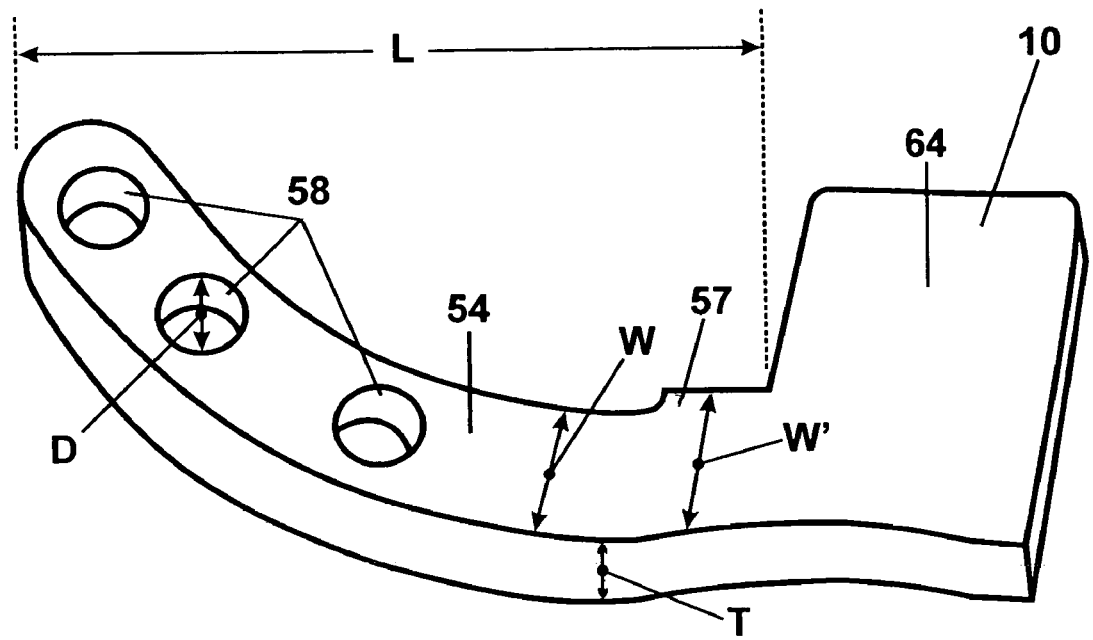
FIG. 1 is a perspective view of a locking device constructed in accordance with a preferred embodiment of the present invention for use on the most common types of couplers.

Referring now to the figures and initially to FIG. 1, there is illustrated a locking device 10 for a gooseneck trailer coupler 12 that is constructed in accordance with a preferred embodiment of the present invention. The present device 10 is for use on most utility type trailers, including horse, stock, flatbed, job site, box, etc., which extend over the bed of a tow vehicle and are lowered onto a towing ball 14 mounted on the vehicle.

As illustrated in FIGS. 3, 5, 6, and 9, when viewed from above, a typical gooseneck coupler 12 contains two main components: a fixed upper plate 16 provided with a socket or tow ball opening 18 there through for receiving a towing ball 14; and a moveable, lower latching plate 20 which is also provided with a socket or tow ball opening 22 there through for receiving a towing ball 14. The lower latching plate 20 is hinged to the fixed upper plate 16 to allow horizontal movement of the lower latching plate 20.

The lower latching plate 20 is held in a horizontal pivoting relationship at a front end 24 of the coupler 12 by a short hinge pin 26. As illustrated in FIG. 4, typically, the hinge pin 26 contains a shoulder or head 28 on one end. The hinge pin 26 is inserted through hinge openings 30 and 32 provided respectively in the upper and lower coupler plates 16 and 20, and is fastened to one of the plates 16 or 20, normally via a weld 34, to prevent removal of the hinge pin 26 from the hinge openings 30 and 32. As shown in FIG. 4, a spacer or washer 31 may be employed in association with the hinge pin 26 and located between the two plates 16 or 20 to provide the necessary clearance between the plates 16 and 20 so that the lower plate 20 can swivel freely relative to the upper plate 16 about the hinge pin 26. The lower latching plate 20 is held in position at an opposite rear end 36 of the coupler 12 by a metal band 38. The metal band 38 is welded at both of its ends 39L and 39R to the lower latching plate 20, or alternately, the metal band 38 is created as a part of the lower latching plate 20 during the casting process.

The metal band 38 is U-shaped to extend above and parallel to the fixed upper plate 16, thereby capturing the upper plate 16 between the metal band 38 and the lower latching plate 20. The metal band 38, the upper plate 16, and the lower latching plate 20 are each provided respectively with rod openings 40, 42, and 44 extending there through. The metal band 38 is secured to the lower latching plate 20 and thus their associated rod openings 40 and 44 are always aligned vertically. When the rod openings 40 and 44 are aligned vertically with rod opening 42, as shown in FIGS. 4 and 6, the rod openings 40, 42, and 44 allow a vertically oriented cylindrical rod or lever 46 to be inserted consecutively through the metal band 38, the upper plate 16, and the lower plate 20, as indicated by Arrow D in FIG. 4.

The function of the rod or lever 46 is to secure the relative positions of the upper and lower plates 16 and 20 and hold them in a normal towing position 48 during normal towing operations. In the normal towing position 48 with the rod openings 40, 42 and 44 aligned, and with the relative position of the plates 16 and 20 secured by the safety rod or lever 46, the effective coupler opening 50, i.e the opening formed by the cooperation of the tow ball openings 18 and 22, will not allow a 2 5/16 inch towing ball 14 to be removed from the coupler 12, thus preventing the associated trailer to which the coupler 12 is attached from becoming unhooked from its tow vehicle. The user may insert or retract the lever 46 from the openings 40, 42, and 44 by grasping a handle 51 of the lever 46 and applying hand pressure in the appropriate direction, i.e. in an-upward direction as indicated by Arrow U in FIG. 4.

As illustrated in FIGS. 5, 6, and 9, a typical gooseneck coupler 12 has three positions: an open position 52, a normal towing position 48, and a fully closed position 53. The open position 52, illustrated in FIG. 5, is open to allow the coupler 12 to slide over a towing ball 14. In the open position 52, the tow ball opening 18 provided in the upper plate 16 of the coupler 12 and the tow ball opening 22 provided in the lower latching plate 20 of the coupler 12 are aligned vertically with each other so that a towing ball 14 can be inserted through the tow ball openings 18 and 22. The normal towing position 48, illustrated in FIG. 6, is partially closed to prevent the towing ball 14 which was previously inserted through the tow ball openings 18 and 22, from being pulled from the coupler 12 while the trailer is being towed. The fully closed position 53, illustrated in FIG. 9, is the position in which the effective coupler opening 50 of the coupler 12 is at its smallest. When the coupler 12 is in its fully closed position 53, this prevents a ball 14 from being inserted into the opening 50, or alternately, if a ball 14 has already been inserted through the opening 50, prevents the ball 14 from being removed from the coupler 12.

In this fully closed position 53, the lower latching plate 20 of the coupler 12 travels past the normal towing position 48, i.e. that point where the tow ball opening 18 in the fixed upper plate 16 and the tow ball opening 22 in the lower latching plate 20 are aligned vertically. When the lower latching plate 20 is moved as far as it will travel toward the fully closed position 53, the effective coupler opening 50 created by the cooperation of the tow ball openings 18 and 22 in the two plates 16 and 20 is small enough that it will not allow even the smallest size of towing ball 14, i.e. a 1 7/8 inch size, to be inserted therethrough. In this fully closed position 53, the coupler opening 50 is obstructed by the position of the lower latching plate 20 in relation to the fixed upper plate 16.

When the coupler 12 is in its fully closed position 53 without a towing ball 14 first having been inserted through the towing ball openings 18 and 22, the misaligned tow ball openings 18 and 22 prevent a towing ball 14 from being inserted into the towing ball openings 18 and 22 of the coupler 12 and thereby. prevent the coupler 12 from being attached to a towing vehicle via a towing ball 14. It is this inability to attach the coupler 12 to a towing ball 14 when the coupler 12 is in its self-obstructing, fully closed position 53 that forms the basis upon which the present invention works.

Figure 7:
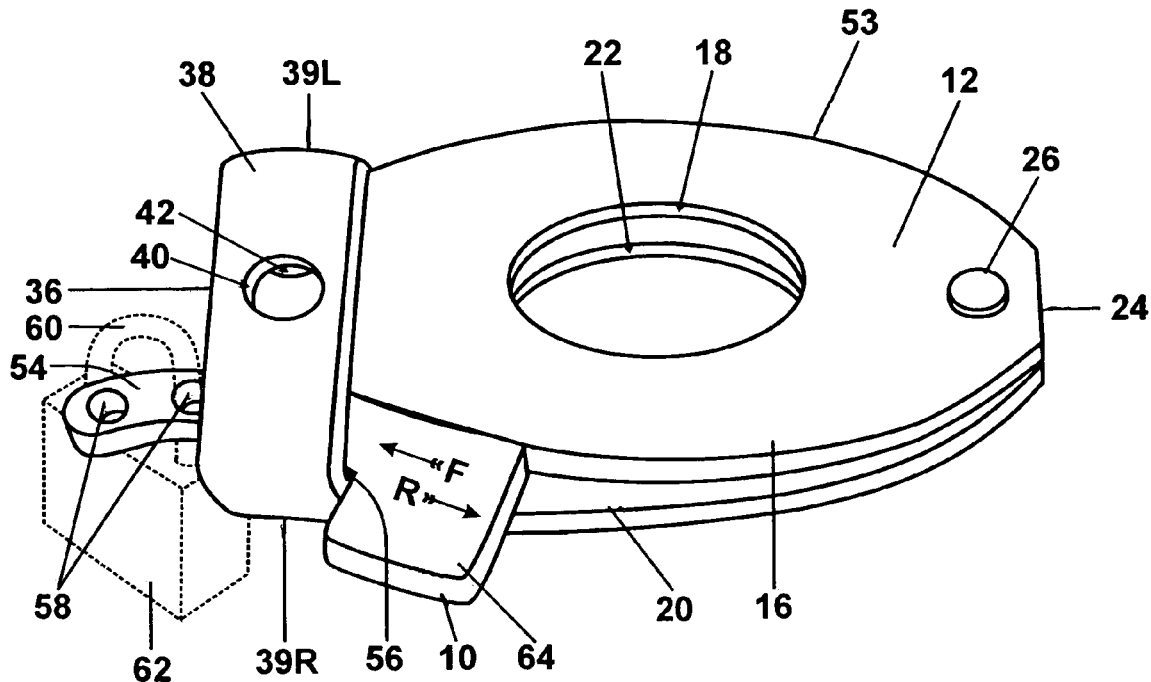
FIG. 7 is a perspective view which shows the locking device of FIG. 1 installed from the front to the back of the gooseneck coupler of FIG. 3 so that openings in the shaft of the device extend beyond the rear of the coupler and are available for engagement by a padlock to secure the device to the coupler.
Figure 8:
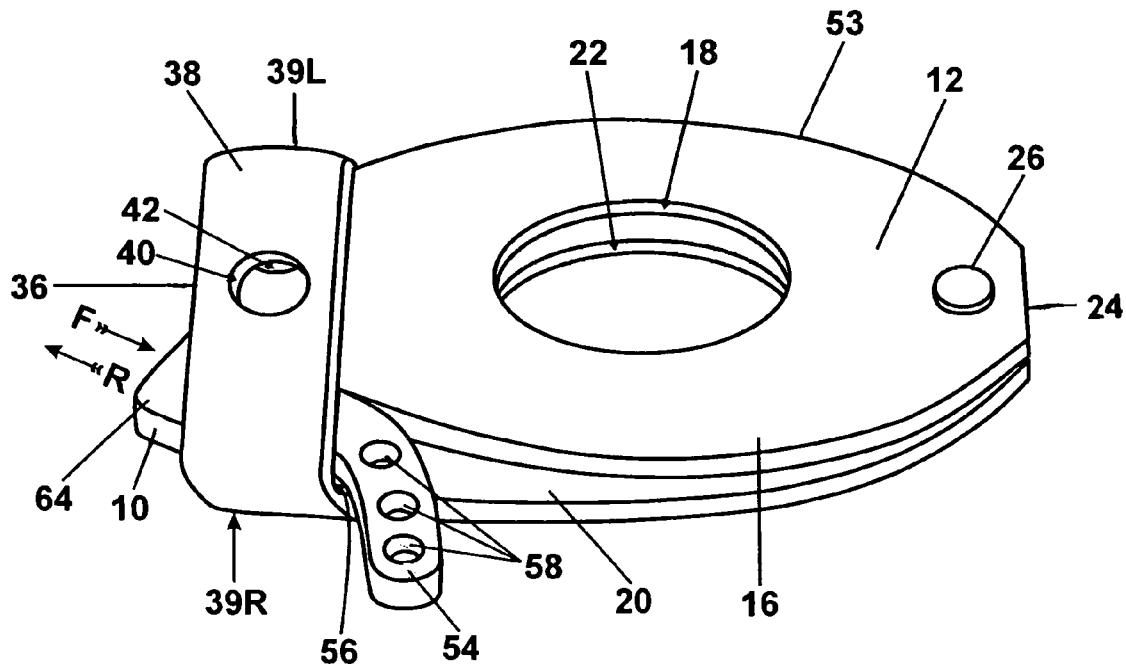
FIG. 8 is a perspective view which shows the locking device installed from the back to the front of the gooseneck coupler of FIG. 3 so that openings in the shaft of the device extend beyond the front of the coupler and are available for engagement by a padlock to secure the device to the coupler.

Referring to FIGS. 1, 7 and 8, the present invention is a one piece locking device 10 that attaches to and disables normal operation of the coupler 12 by restricting the movement of the lower latching plate 20 of a gooseneck trailer coupler 12 when the coupler 12 is placed in a self-obstructing, fully closed position 53. The device 10 is provided with a shaft 54 that is preferably slightly curved and is designed to extend thorough a gap 56, shown in FIGS. 3, 7, 8 and 9, that is formed between the upper plate 16 of the coupler 12 and a metal band 38 on the lower latching plate 20 of the coupler 12. The shaft 54 is provided with an enlarged shoulder 57 located adjacent to a block end 64 of the device 10. The purpose of the shoulder 57 is to effectively increase the width W' of the shaft 54. Some types of couplers 12 need the added width W' provided by the shoulder 57 in order for the device 10 to properly fit the coupler 12. For example, Superior® couplers do not need the added width W' provided by the shoulder 57, but Bulldog® and Stallion® couplers 12 do need the added width W' provided by the shoulder 57 in order to achieve a proper fit of the device 10 with the coupler 12. Thus, the shoulder 57 is provided on the device to allow it to fit most brands of couplers 12.

The shaft 54 of the device 10 is provided with at least one and preferably several padlock openings 58 there through. Each of the padlock openings 58 is designed for receiving a shackle 60 of a padlock 62, as shown in outline in FIG. 7. The device 10 is also provided with an opposite block end 64 that is larger than the shaft 54.

To use the device 10, the lower latching plate 20 must be moved as far as possible to the fully closed position 53, as illustrated by FIG. 9. The shaft 54 of the device 10 is then inserted into the gap 56, as shown by Arrow F in FIGS. 7 and 8, as far as possible so that at least one padlock opening 58 has passed through the gap 56 and extends beyond the coupler 12, as shown in FIGS. 7 and 8. The block end 64 of the device 10 is too large to enter the gap 56 and serves to limit insertion of the device 10 into the gap 56. When the locking device 10 is inserted into the gap-either from the front end 24 of the coupler 12, as shown in FIG. 7, or from the rear end 36 of the coupler 12, as shown in FIG. 8, movement of the lower latching plate 20 is restricted relative to the upper plate 16 and the coupler 12 is forced to remain in its fully closed position 53. Once the device 10 is thus properly installed in the coupler 12, the device 10 must be secured in place. This is accomplished by inserting a padlock 62 through one of the padlock openings 58 that is now extending beyond the coupler 12. The padlock opening 58 that is located closest to the coupler 12 and which provides a clear path for the lock shackle 60 to enter there through is to be used for this purpose. When the locking device 10 is secured in place, the coupler opening 50 is too small to allow standard sized 2 5/16 inch, 2 inch, and 1 7/8 inch towing balls 14 to be inserted into the coupler 12. This prevents the trailer associated with the coupler 12 from being connected to a tow vehicle equipped with a typical towing ball 14 without first removing the locking device 10 and opening the coupler 12 to a normally opened position 52. By locking the trailer coupler 12 in its fully closed position 53, the trailer coupler 12 is self-obstructing to protect the trailer from theft.

To remove the device 10 from the coupler 12, the padlock 62 is removed from the padlock opening 58 and the device 10 is pulled out of the coupler 12 by moving the device in the opposite direction from which it was inserted in the gap, as shown by Arrows R in FIGS. 7 and 8. When the device 10 has been removed from the coupler 12, this frees the coupler 12 to function in a normal manner, i.e. allows the lower latching plate 20 to again move freely relative to the upper plate 16 in order to allow a towing ball 14 to enter the tow ball openings 18 and 22 provided in each of the two plates 16 and 20.

When the locking device 10 is not in use, it can be easily attached to the trailer coupler 12 until it is again needed. This prevents the locking device 10 from being lost or misplaced. For the purpose of storing the locking device which is not in use, the locking device 10 can be attached to the trailer coupler 12 by simply inserting a locking means, such as the padlock 62, through one of the padlock openings 58 in the shaft 54 of the device 10 and using the padlock 62 to attach the locking device 10 somewhere on the trailer coupler 12 where it will not interfere with the operation of the coupler 12.

Figure 2:
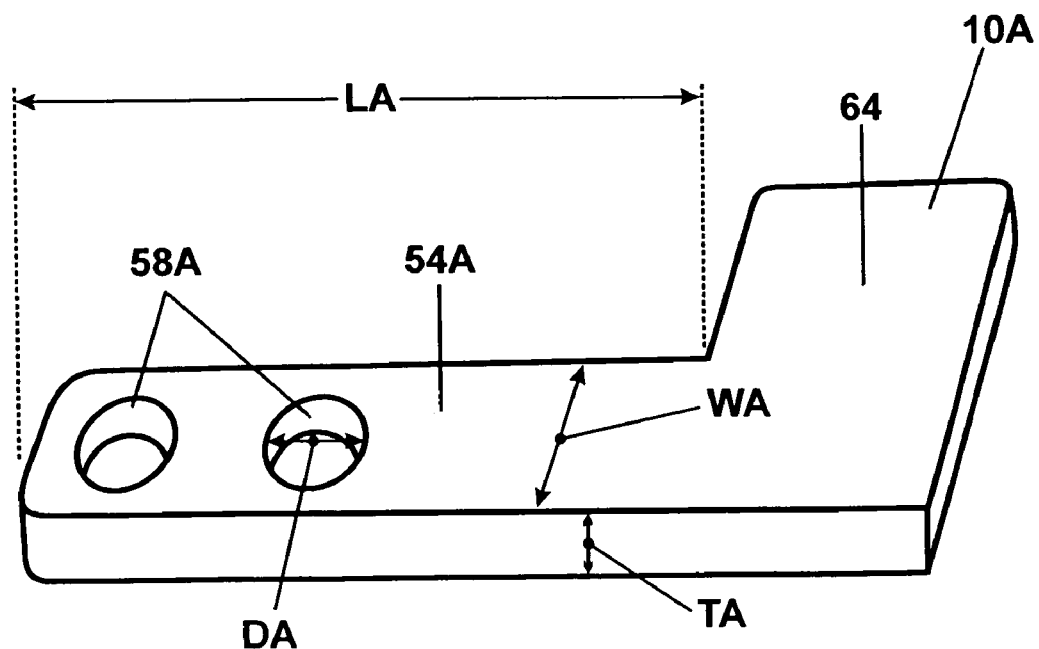
FIG. 2 is a perspective view of an alternate embodiment of the present invention.

Referring now to FIG. 2, there is illustrated an alternate embodiment 10A of the present invention. The alternate embodiment 10A is shown with an alternate shaft 54A that is straight rather than curved. Like the preferred embodiment 10, the alternate embodiment 10A is provided with alternate padlock openings 58A in the alternate shaft 54A and with an opposite block end 64.

Both the preferred embodiment 10 and the alternate embodiment 10A are preferably constructed of a single piece of steel that can be cut from plate steel using standard metal cutting techniques. The steel should be of sufficient hardness and thickness to resist attempts to defeat the locking device 10 or 10A. The locking device 10 or 10A is designed with a shaft 54 or 54A that is of an appropriate length, as indicated in FIGS. 1 and 2 by the letters L or LA, and of sufficient width, as indicated in FIGS. 1 and 2 by the letters W, W' and WA, and thickness, as indicated in FIGS. 1 and 2 by the letters T and TA, to allow the shaft 54 or 54A it to pass through the gap 56.

In use, when the locking device 10 or 10A is inserted fully into the gap 56, i.e. inserted into the gap 56 until the block end 64 of the locking device 10 or 10A contacts the coupler 12, the length L or LA of the shaft 54 or 54A of the locking device 10 or 10A must be sufficient to extend past the coupler 12 so that at least one of the padlock openings 58 or 58A is available so that the shackle 60 of the padlock 62 can be inserted there through as a means of securing the locking device 10 or 10A in place on the coupler 12. Padlock openings 58 or 58A which are of an appropriate diameter, as shown by the letters D and DA in FIGS. 1 and 2, to accommodate a typical padlock shackle 60 are provided in the shaft 54 or 54A. The padlock openings 58 or 58A must be placed in the shaft 54 or 54A at specific locations dependent upon the manufacturer design and tolerances of the gooseneck coupler 12 in order to provide a clear path for a padlock shackle 60, but close enough to the coupler 12 to limit forward and backward movement, as indicated respectively by arrows F and R in FIGS. 7 and 8, of the locking device 10 or 10A within the gap 56.

The width W, W' or WA of the shaft 54 or 54A of the locking device 10 or 10A must be sufficient to prevent excessive horizontal movement of the lower latching plate 20 while accommodating the less than perfect tolerances of common gooseneck couplers 12. The thickness T or TA of the locking device 10 or 10A must be sufficient to prevent the locking device 10 or 10A from being forced into a position other than the fully closed position 53 that is illustrated in FIGS. 7, 8, and 9. The block end 64 of the locking device 10 or 10A must be of a specific size and shape to prevent the block end 64 from passing through the gap 56 and to limit the distance the locking device 10 or 10A can travel into the gap 56.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A locking device disabling normal coupler operations by restricting the movement of a lower latching plate of a gooseneck trailer coupler when the lower latching plate of the coupler is placed in a fully closed position and the locking device is inserted into a gap created between a fixed upper plate and a band of the lower latching plate of the coupler wherein the locking device comprises:

a single block of metallic material having an elongated shaft extending outward from an enlarged block end, said shaft provided with at least one padlock opening, said shaft being sufficiently small in size to allow it to be inserted through a gap formed between a fixed upper plate of a coupler and a metal band of a lower latching plate of the coupler when the coupler is in its fully closed position so as to hold the coupler in the fully closed position, said shaft being of a sufficient length to allow at least one padlock opening in the shaft to pass through said gap and clear the coupler so that a padlock can be inserted through said padlock opening to hold the shaft in the gap, said block end being sufficiently large in size to prevent it from being inserted into said gap, said shaft is curved, and an enlarged shoulder provided on the shaft adjacent to the block end increasing the effective width of the shaft.

2. A locking device for a gooseneck trailer coupler comprising:

a single metal piece, said piece having an elongated shaft extending outward from an enlarged block end, said shaft provided with padlock openings along its length so that when the shaft is inserted through a gap formed between a fixed upper plate of a coupler and a metal band of a lower latching plate of the coupler with the coupler is in its fully closed position at least one of the padlock openings in the shaft pass through said gap and clear the coupler sufficiently so that a padlock can be inserted through said padlock opening to hold the shaft in the gap, said block end being sufficiently large in size to prevent it from being inserted into said gap, said shaft is curved, and an enlarged shoulder provided on the shaft adjacent to the block end increasing the effective width of the shaft.

3. A locking device for a gooseneck trailer coupler comprising:

a single metal piece with an elongated shaft extending from an enlarged block end, said shaft provided with at least one padlock opening, said shaft is curved, and an enlarged shoulder provided on the shaft adjacent to the block end increasing the effective width of the shaft.

* * * * *